United States Patent
Nishikawa et al.

(10) Patent No.: US 6,730,459 B2
(45) Date of Patent: May 4, 2004

(54) MICROLENS ARRAY, METHOD FOR FABRICATING THE SAME AND OPTICAL DEVICES

(75) Inventors: Takao Nishikawa, Suwa (JP); Atsushi Takakuwa, Suwa (JP)

(73) Assignee: Seiko Epson Corporation (JP)

( * ) Notice: Subject to any disclaimer, the term of this patent is extended or adjusted under 35 U.S.C. 154(b) by 151 days.

(21) Appl. No.: 09/917,243

(22) Filed: Jul. 27, 2001

(65) Prior Publication Data

US 2002/0048729 A1 Apr. 25, 2002

(30) Foreign Application Priority Data

Jul. 27, 2000 (JP) .................................. 2000-226675

(51) Int. Cl.[7] .............................................. G02B 1/10
(52) U.S. Cl. ..................... 430/321; 359/619; 427/164; 427/372.2; 427/487; 257/432
(58) Field of Search ................... 427/508, 487, 427/162, 164, 372.2; 430/321; 257/432; 349/95; 359/619; 264/1.1, 1.36, 1.38, 2.5

(56) References Cited

FOREIGN PATENT DOCUMENTS

| JP | 11-326603 A | * | 11/1999 |
| JP | 2000-158551 A | * | 6/2000 |

* cited by examiner

*Primary Examiner*—John A. McPherson
(74) *Attorney, Agent, or Firm*—Harness, Dickey & Pierce, P.L.C.

(57) ABSTRACT

A method for fabricating a microlens array having a flat surface by a simple process, a microlens array fabricated, thereby and an optical device. The method for fabricating the microlens array includes a first step of bringing a lens side of a microlens array substrate 10 having a plurality of lenses 12 formed thereon into close contact with a flat surface 22 of a master plate 20, in which one surface is the flat surface 22, with a light transmitting layer precursor 30 therebetween; a second step of curing the light transmitting layer precursor 30 to form a light transmitting layer 32; and a third step of releasing the master plate 20 from the light transmitting layer 32.

12 Claims, 10 Drawing Sheets

MICROLENS ARRAY, METHOD FOR FABRICATING THE SAME AND OPTICAL DEVICES

FIELD OF THE INVENTION

The present invention relates to a microlens array, a method for fabricating the same, and an optical device.

DESCRIPTION OF THE RELATED ART

To date, a microlens array formed by arranging a plurality of minute lenses has been applied to a liquid crystal panel, for example. By applying the microlens array, the individual lenses focus incident light into corresponding pixels. Thus, a display screen can be made bright.

The lens side of the microlens array has bumps and dips, but it is required to be flat in order to form electrodes thereon. Conventionally, a flat surface has been formed by attaching a cover glass to the lens side with, for example, an adhesive and polishing it to make it thin. However, the polishing process in particular takes a long time.

The present invention aims to solve such problems. The object thereof is to provide a method for fabricating a microlens array having a flat surface by a simple process, the microlens array fabricated thereby, and an optical device.

SUMMARY OF THE INVENTION (1) The method for fabricating the microlens array in the invention includes a first step of bringing a lens side of a microlens array substrate having a plurality of lenses formed thereon into close contact with a flat surface of a master plate, in which one surface is the flat surface, with a light transmitting layer precursor therebetween;

a second step of curing the light transmitting layer precursor to form a light transmitting layer; and a third step of releasing the master plate from the light transmitting layer.

According to the invention, the light transmitting layer is formed on the lens side of the microlens array substrate. The upper side of the light transmitting layer is flattened by the flat surface of the master plate. In this manner, according to the invention, a simple process in which the master plate is brought into close contact with the light transmitting layer precursor and is then released can form the light transmitting layer having a flat surface on the lens side of the microlens array substrate.

(2) This method for fabricating the microlens array may further include a step of forming at least one of a black matrix, an electrode, and an alignment layer on the light transmitting layer.

According to this, at least one of the black matrix, the electrode, and the alignment layer can be formed on the flat surface of the light transmitting layer.

(3) This method for fabricating the microlens array may further include a step of depositing a protective coating on the light transmitting layer.

According to this, even though a material having a low durability is used as the light transmitting layer, the protective coating can protect the light transmitting layer.

(4) This method for fabricating the microlens array may further include a step of forming at least one of the black matrix, the electrode, and the alignment layer on the protective coat.

According to this, at least one of the black matrix, the electrode, and the alignment layer can be formed on the protective coating that has been deposited on the flat surface of the light transmitting layer.

(5) In the method described in any one of the methods for fabricating the microlens array, the light transmitting layer precursor may include a substance which can be cured by applying energy.

(6) In this method for fabricating the microlens array, the energy may be at least one of light and heat.

(7) In the method described in any one of the methods for fabricating the microlens array, the light transmitting layer precursor may be made of a resin.

(8) The microlens array in the invention is fabricated by the methods described above.

(9) The optical device in the invention has the microlens array described above.

(10) This optical device may be a display device having a light source for radiating light toward the microlens array.

(11) This optical device may be an imaging device having an image pick-up device that lights focussed by the microlens array enters.

DETAILED DESCRIPTION OF THE PREFERRED EMBODIMENTS

Figure 1:
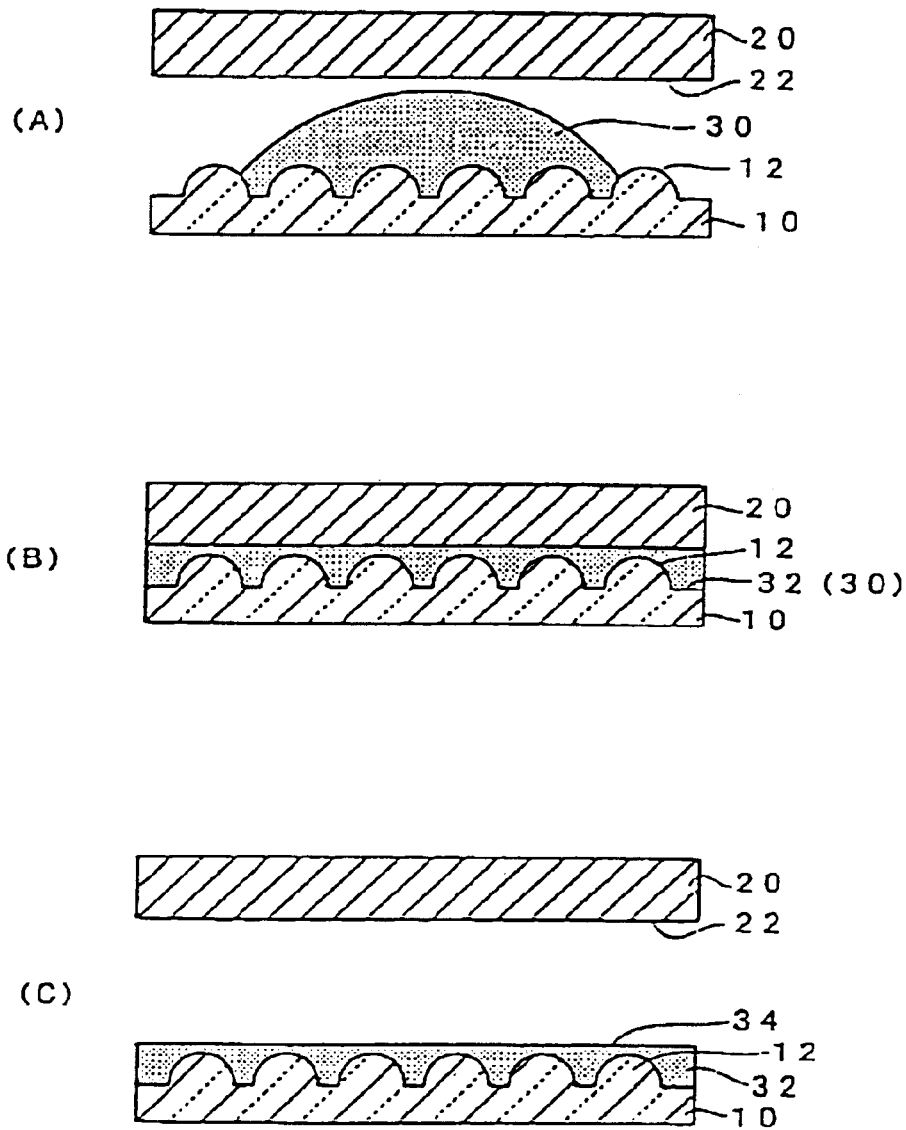
FIGS. 1(A) to 1(C) depict diagrams illustrating the method for fabricating the microlens array in an embodiment in which the present invention is applied.
Figure 2:
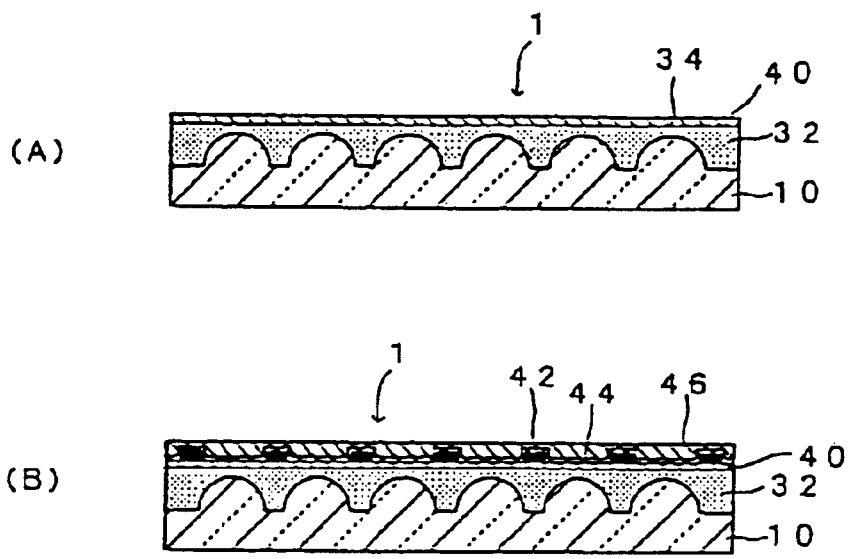
FIGS. 2(A) and 2(B) depict diagrams illustrating the method for fabricating the microlens array in the embodiment in which the present invention is applied.

Hereafter, preferred embodiments of the invention will be described with reference to the drawings.

FIGS. 1(A) to 2(B) depict diagrams illustrating the method for fabricating the microlens array in the embodiment in which the present invention is applied. In the embodiment, the microlens array comprises a light transmitting layer formed on the lens side of a microlens array substrate having a plurality of lenses formed thereon.

A microlens array substrate 10, a master plate 20, and a light transmitting layer precursor 30 shown in FIG. 1(A) are prepared. Additionally, the material for forming the layer constituting the microlens array substrate 10 may be called a first light transmitting layer precursor and the light transmitting layer precursor 30 may be called a second light transmitting layer precursor. Furthermore, the layer constituting the microlens array substrate 10 may be referred as a first light transmitting layer and a light transmitting layer 32 formed by the light transmitting layer precursor 30 may be referred as a second light transmitting layer.

The microlens array substrate 10 transmits light. A plurality of lenses 12 is formed on at least one side of the microlens array substrate 10 (in many cases, it is formed only on one side). Each of the lenses 12 shown in FIG. 1(A) is a convex lens, but it may be a concave lens.

A flat surface 22 is formed on a master plate 20. The flat surface 22 has an area corresponding to the area having the plurality of lenses 12 of the microlens array substrate 10 formed thereon. The master plate 20 may have the shape of the substrate; in this case, one side may be the flat surface 22. The master plate 20 may be formed of metal, or may be formed of a light-transmitting material such as glass.

The light transmitting layer precursor 30 preferably has high light transmission because it is formed over the lenses 12 of the microlens array substrate 10. Additionally, the light transmitting layer precursor 30 has a property for contacting the lens surface of the lenses 12 to refract light at the interface. That is, the light transmitting layer precursor 30, when cured, has a different refractive index from that of the lenses 12 of the microlens array substrate 10.

In the embodiment, the side formed with the lenses 12 of the microlens array substrate 10 is brought into close contact with the flat surface 22 of the master plate 20 with the light transmitting layer precursor 30 therebetween. Then, the light transmitting layer precursor 30 is spread over a predetermined region to form the light transmitting layer 32 made of the light transmitting layer precursor 30 between the microlens array substrate 10 and the master plate 20, as shown in FIG. 1(B).

In FIG. 1(A), the light transmitting layer precursor 30 is placed on the side having the lenses 12 of the microlens array substrate 10 formed thereon. However, it may be placed on the master plate 20 or on both the microlens array substrate 10 and the master plate 20. Furthermore, the light transmitting layer precursor 30 may be spread over one or both of the microlens array substrate 10 and the master plate 20 beforehand by methods such as spin coating, spray coating, roll coating, bar coating, or dipping.

The light transmitting layer precursor 30 preferably has excellent releasability from the master plate 20 and process resistance in the subsequent processes. The light transmitting layer precursor 30 may be a liquid substance or liquefiable substance. As the liquid substance, substances which can be cured by applying energy can be utilized. As the liquefiable substance, substances having plasticity can be utilized.

Additionally, when a resin is selected as the light transmitting layer precursor 30, that having an energy curable property or plasticity is preferable.

As the resin having the energy curable property, it is desirable that the resin is curable by applying at least either light or heat. In utilizing light or heat, a commercially available photolithography machine and a heater such as a baking furnace or a hot plate can be utilized, which can save equipment costs.

As the resin having such an energy curable property, acrylic resins, epoxy resins, melamine resins, and polyimide resins, for example, can be utilized. The acrylic resins are particularly preferable because those being cured for a short time with light irradiation can be obtained easily by utilizing a variety of commercially available precursors or sensitizers (photopolymerization initiators).

As a specific example of a basic composition of the light-curable acrylic resins, prepolymers, oligomers, monomers, or photopolymerization initiators are given.

As the prepolymers or oligomers, for example, acrylates such as epoxy acrylates, urethane acrylates, polyester acrylates, polyether acrylates, and spiroacetal acrylates; and methacrylates such as epoxy methacrylates, urethane methacrylates, polyester methacrylates, and polyether methacrylates can be utilized.

As the monomers, for example, monofunctional monomers such as 2-ethylhexyl acrylate, 2-ethylhexyl methacrylate, 2-hydroxyethyl acrylate, 2-hydroxyethyl methacrylate, N-vinyl-2-pyrolidone, Carbitol acrylate, tetrahydrofurfuryl acrylate, isobornyl acrylate, dicyclopentenyl acrylate, and 1,3-butanediol acrylate; difunctional monomers such as 1,6-hexanediol diacrylate, 1,6-hexanediol dimethacrylate, neopentyl glycol diacrylate, neopentyl glycol dimethacrylate, ethylene glycol diacrylate, polyethylene glycol diacrylate, and pentaerythritol diacrylate; and polyfunctional monomers such as trimethylolpropane triacrylate, trimethylolpropane trimethacrylate, pentaerythritol triacrylate, and dipentaerythritol hexaacrylate can be utilized.

As the photopolymerization initiators, for example, acetophenones such as 2,2-dimethoxy-2-phenylacetophenone; butyl phenones such as α-hydroxy isobutyl phenone and p-isopropyl-α-hydroxy isobutyl phenone; acetophenone halides such as p-tert-butyl dichloroacetophenone, p-tert-butyl trichloroacetophenone, and α,α-dichlor-4-phenoxyacetophenone; benzophenones such as benzophenone and N,N-tetraethyl-4,4-diaminobenzophenone; benzyls such as benzyl and benzyldimethylketal; benzoins such as benzoin and benzoin alkyl ether; oximes such as 1-phenyl-1,2-propanedion-2-(o-ethoxycarbonyl)oxime; xanthones such as 2-methylthioxanthone and 2-chlorothioxanthone; and radical generating compounds such as Michler's ketone and benzyl methylketal can be utilized.

Additionally, compounds such as amines may be added for preventing oxygen from inhibiting curing, or solvent components may be added for facilitating spreading as necessary. The solvent components are not defined particularly; a variety of organic solvents such as propylene glycol monomethyl ether acetate, methoxymethyl propionate, ethoxyethyl propionate, ethyl lactate, ethyl pyruvinate, methyl amyl ketone can be utilized.

These substances are preferable because they have excellent releasability when the master plate 20 is formed of silicon or quartz having excellent flatness.

Furthermore, as the resins having plasticity, resins having thermoplasticity such as polycarbonate resins, polymethyl methacrylate resins, and amorphous polyolefine resins can be utilized. Heating such a resin at the softening point temperature or above plasticates and liquefies it. After it is sandwiched between the microlens array substrate 10 and the master plate 20, as shown in FIG. 2(B), the plasticated resin is cooled to cure it. Then, the light transmitting layer 32 is formed.

Moreover, when the microlens array substrate 10 is attached to the master plate 20, pressure may be applied via at least one of the microlens array substrate 10 and the master plate 20, as necessary. Applying pressure can shorten the period of time to spread the light transmitting layer precursor 30 over a predetermined region. Thereby, workability can be improved.

Then, curing treatment is applied in accordance with the light transmitting layer precursor 30. For example, when a light-curable resin is used, light is radiated under predetermined conditions. Thereby, the light transmitting layer precursor 30 is cured to form the light transmitting layer 32, as shown in FIG. 2(B).

Subsequently, the master plate 20 is released from the light transmitting layer 32, as shown in FIG. 1(C) and then the light transmitting layer 32 remains on the side of the microlens array substrate 10 having the lenses 12 formed thereon. On the light transmitting layer 32, a flat surface 34 is formed corresponding to the flat surface 22 of the master plate 20.

After that, a protective coating 40 may be deposited on the flat surface 34 of the light transmitting layer 32, as shown in FIG. 2(A). The protective coating 40 is not defined particularly in case of those having resistance to the subsequent processes, but inorganic materials, for example, can be used. Specifically, glass precursors such as polysilazane and polysiloxane can form the protective coating 40.

The protective coating 40 may be formed of a ceramic. The protective coating 40 may be formed of silicon dioxide ($SiO_2$) in the form of quartz glass (silicate glass). Silicon dioxide ($SiO_2$) has a hard surface, has excellent heat resistance, water resistance, chemical resistance, and durability, and can be formed at low cost. Colloidal silicas (silica sols) may be used for forming it. Raw materials having silica sols and silane coupling agents as principal constituents may be used. The silane coupling agents enhance adhesion to the light transmitting layer 32 which is an under layer. Additionally, surface active agents for enhancing surface wettability or catalysts for facilitating reactions may be added. The silica sols (alternatively, raw materials having silica sols and silane coupling agents as principal constituents) can be disposed evenly at low temperatures by spin coating or dipping.

Before the protective coating 40 is deposited, surface treatment (plasma treatment or silane coupling treatment, for example) for improving the adhesion or the wettability to the protective coating 40 may be applied to the surface of the light transmitting layer 32.

The protective coating 40 is not needed in the case where the light transmitting layer 32 itself has process resistance. A microlens array 1 can be obtained in this manner.

Then, as shown in FIG. 2(B), at least one of a black matrix 42, an electrode (electrode film) 44, and an alignment layer 46 is deposited on the light transmitting layer 32 or on the protective coating 40 formed thereon. The black matrix 42 is deposited by etching a film made of chromium. The protective coating 40 has process resistance to this etching process. When the light transmitting layer 32 has process resistance to the etching process, the protective coating 40 is not needed. The alignment layer 46 is deposited by disposing a material of a polyimide resin or its precursor by a coating method and firing it at temperatures of 100 to 350° C.

As the coating method, methods of spin coating, roll coating, or flexographic printing can be utilized. The firing temperatures are properly set in accordance with the materials to be used. The electrode 44 is an ITO (Indium Tin Oxide) film, for example, which is deposited by vacuum deposition such as spattering or evaporation and then annealing treatment is applied. The annealing treatment temperatures are 100 to 300° C. in general, but higher temperatures are preferable because resistance values are reduced and an excellent electrode film is deposited. Additionally, firing for depositing the alignment layer 46 and annealing treatment for the electrode 44 may be conducted at the same time.

According to the embodiment, a simple process, in which the master plate 20 is brought into close contact with the light transmitting layer precursor 30 and is released, can form the light transmitting layer 32 having the flat surface 34 on the lenses 12 of the microlens array substrate 10.

Figure 3:
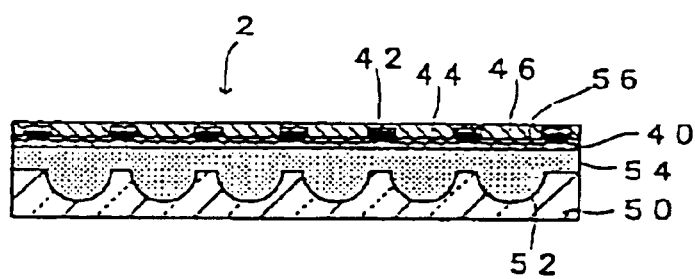
FIG. 3 depicts a diagram illustrating a modified example of the embodiment in which the present invention is applied.

FIG. 3 depicts a diagram illustrating a modified example of the microlens array in the embodiment in which the present invention is applied. A microlens array 2 shown in the same drawing includes a microlens array substrate 50 having a plurality of concave lenses 52 formed thereon. On the side of the microlens array substrate 50 having the lenses 52 formed thereon, a light transmitting layer 54 is formed. The details described in the above-mentioned embodiment can be applied to the materials and forming methods of the light transmitting layer 54. The light transmitting layer 54 is formed with a flat surface 56. On the light transmitting layer 54, at least one of a black matrix 42, an electrode 44, and an alignment layer 46 is formed, similarly to that shown in FIG. 2(B). This modified example can also provide the same effects as the above-mentioned embodiment.

Figure 4:
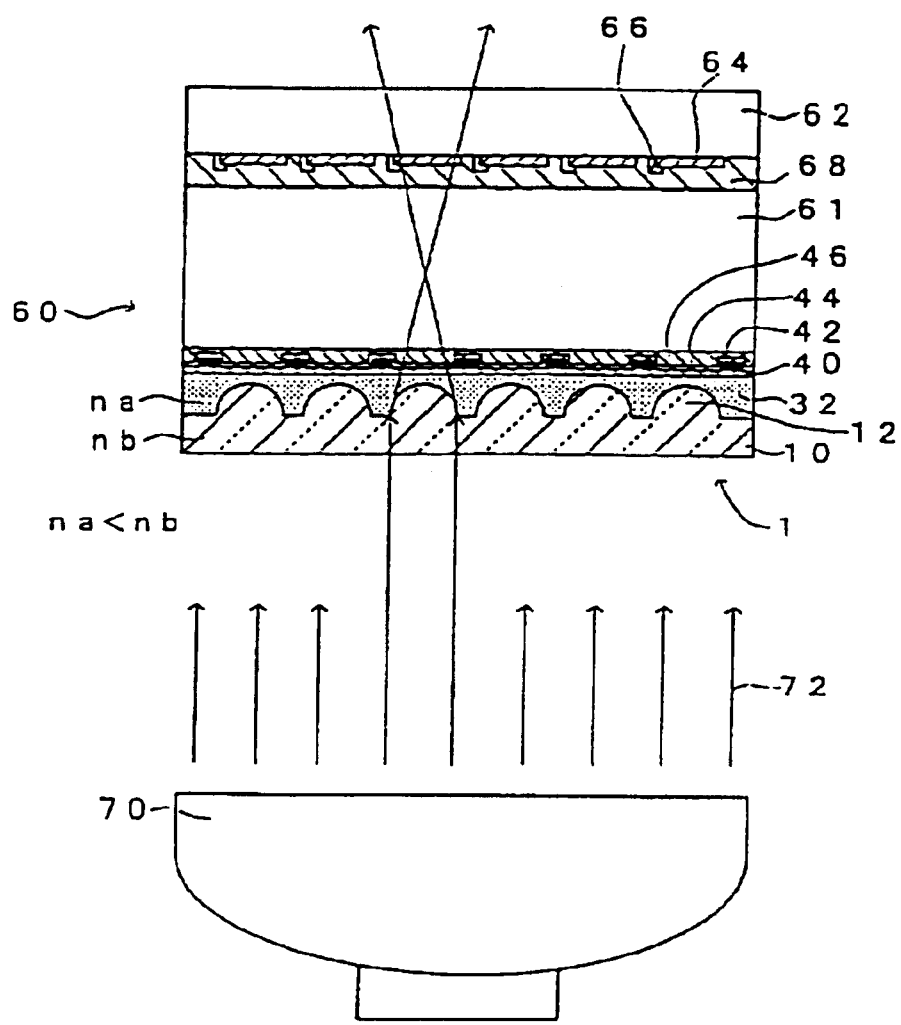
FIG. 4 depicts a diagram illustrating an electronic device provided with the microlens array in which the present invention is applied.

FIG. 4 depicts a diagram illustrating part of a liquid crystal projector as one example of a display device in which the microlens array of the present invention is applied. This liquid crystal projector has a light valve 60 incorporating the microlens array 1 fabricated by the method in the embodiment described above and a lamp 70 as a light source.

The microlens array 1 is arranged so that the lenses 12 are concave when seen from the lamp 70. Additionally, a TFT substrate 62 is spaced from the alignment layer 46 by a gap. On the TFT substrate 62, transparent discrete electrodes 64 and thin-film transistors 66 are disposed. An alignment layer 68 is deposited thereon. Furthermore, the TFT substrate 62 is arranged with the alignment layer 68 facing the alignment layer 46.

Liquid crystal 61 is sealed between the alignment layers 46 and 68. The liquid crystal 61 is driven by a voltage that is controlled by the thin-film transistors 66.

According to this liquid crystal projector, light 72 irradiated from the lamp 70 is focussed at the lenses 12 at every pixel. Thus, a brighter screen can be displayed.

Moreover, as a precondition, it is necessary that the optical refractive index na of the light transmitting layer 32 and the optical refractive index nb of the microlens array substrate 10 have the relationship:

na<nb.

When this condition is satisfied, the light is allowed to enter the medium having the smaller refractive index from the medium having the greater refractive index. The light 72 is refracted so as to bend away from the normal of the interface of both media to be focussed. Thus, the screen can be made brighter.

Figure 5:
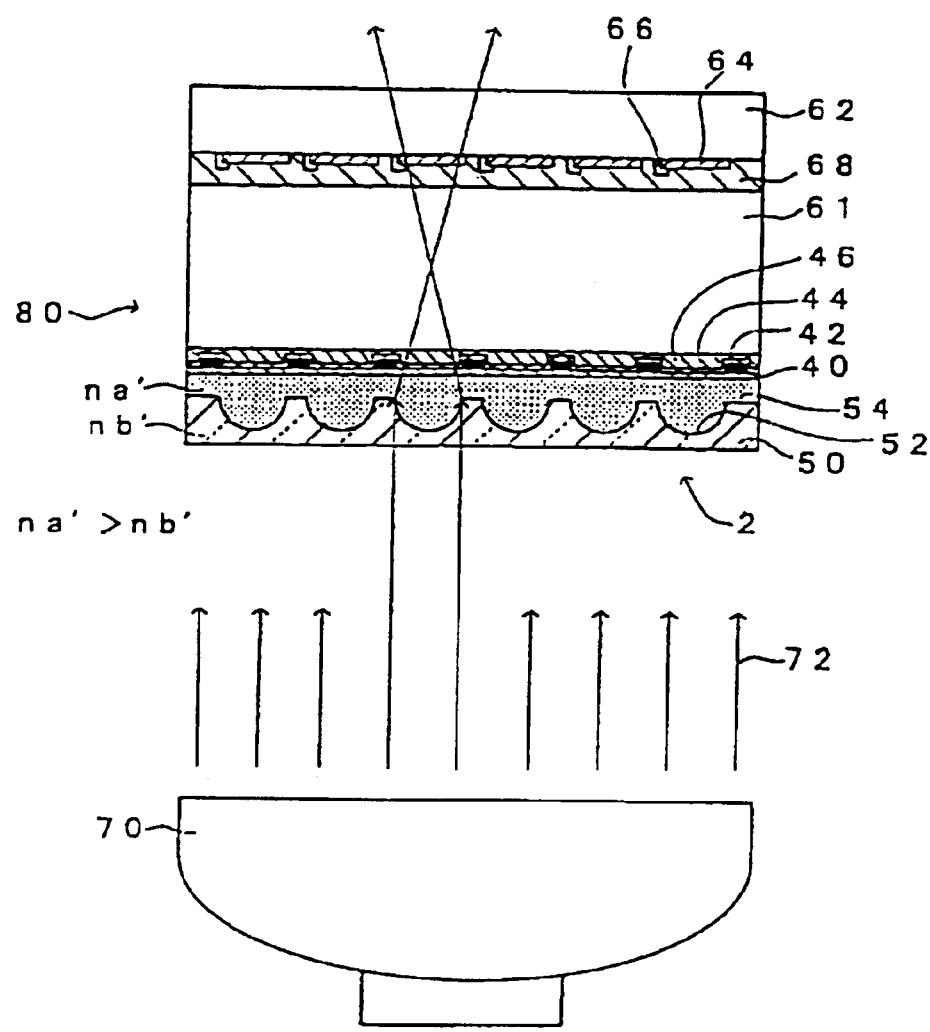
FIG. 5 depicts a diagram illustrating an electronic device provided with the microlens array in which the present invention is applied.
Figure 6:
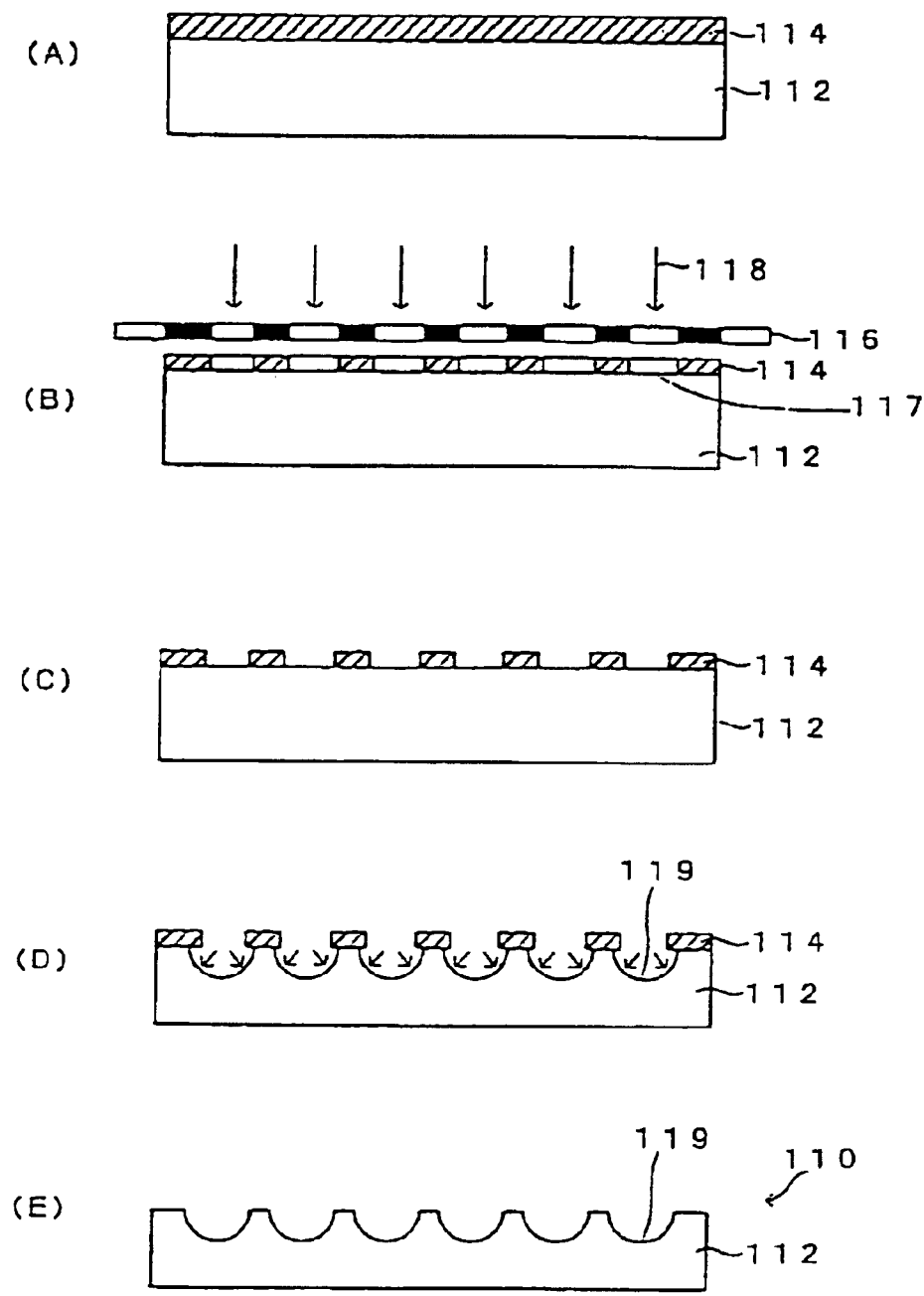
FIGS. 6(A) to 6(E) depict diagrams illustrating the steps of producing a master plate for fabricating the microlens array substrate.
Figure 7:
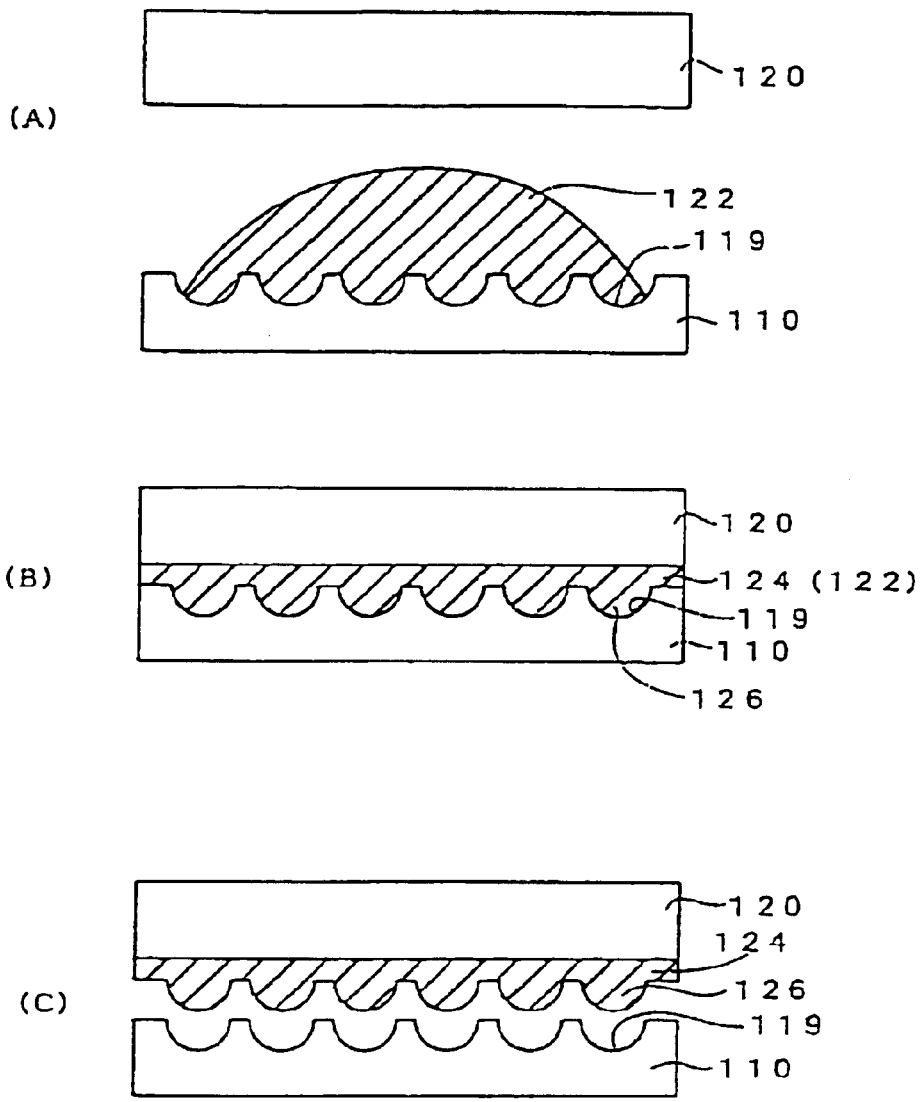
FIGS. 7(A) to 7(C) depict diagrams illustrating the steps of producing an intermediate plate from the master plate for fabricating the microlens array substrate.
Figure 8:
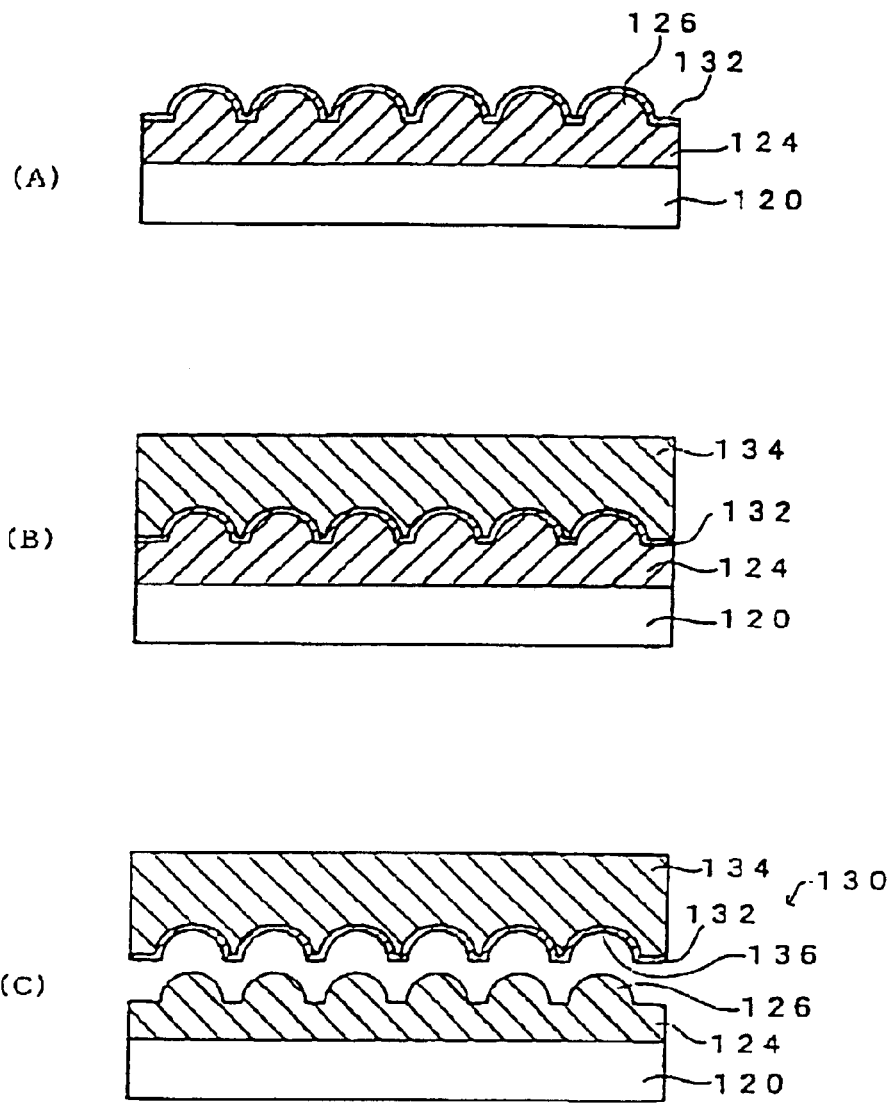
FIGS. 8(A) to 8(C) depict diagrams illustrating the steps of producing a replica plate from the intermediate plate for fabricating the microlens array substrate.
Figure 9:
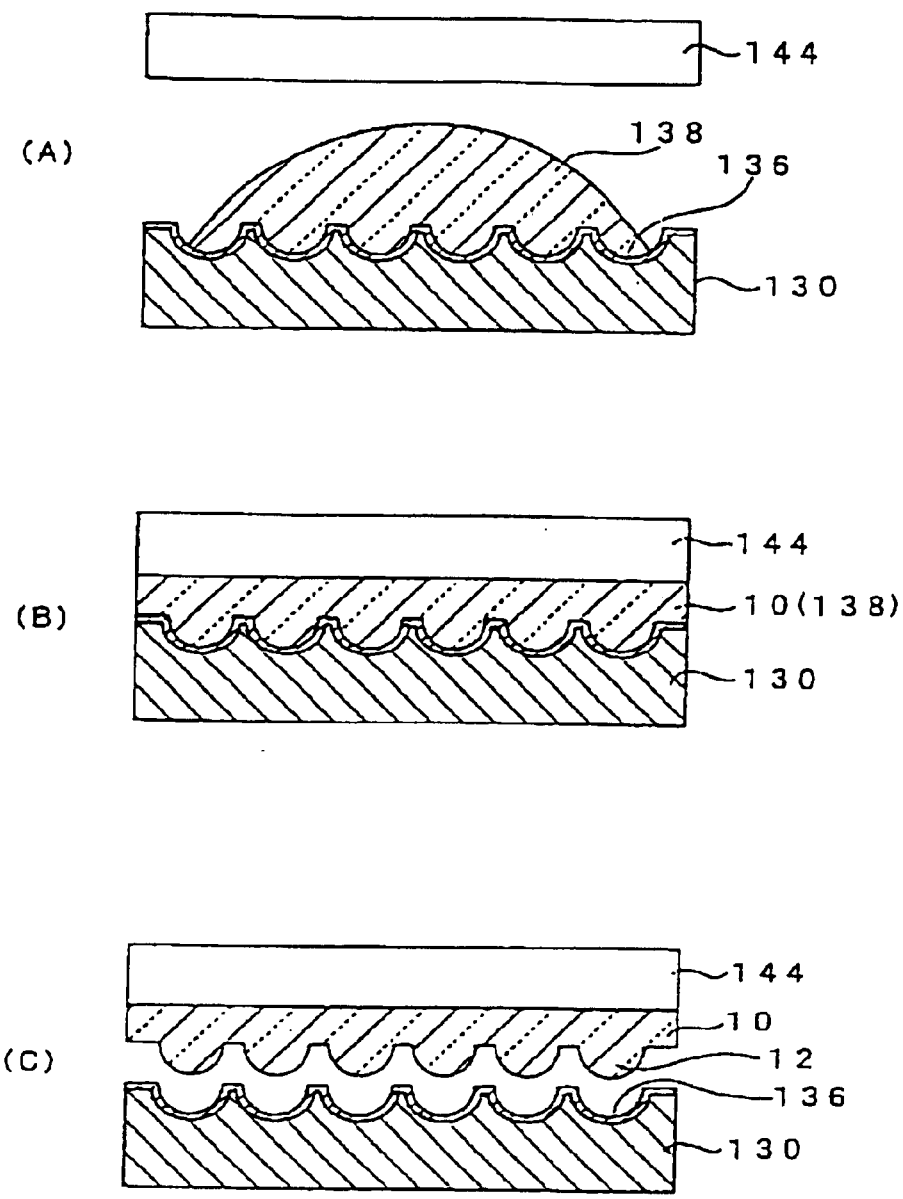
FIGS. 9(A) to 9(C) depict diagrams illustrating the steps of fabricating the microlens array substrate.
Figure 10:
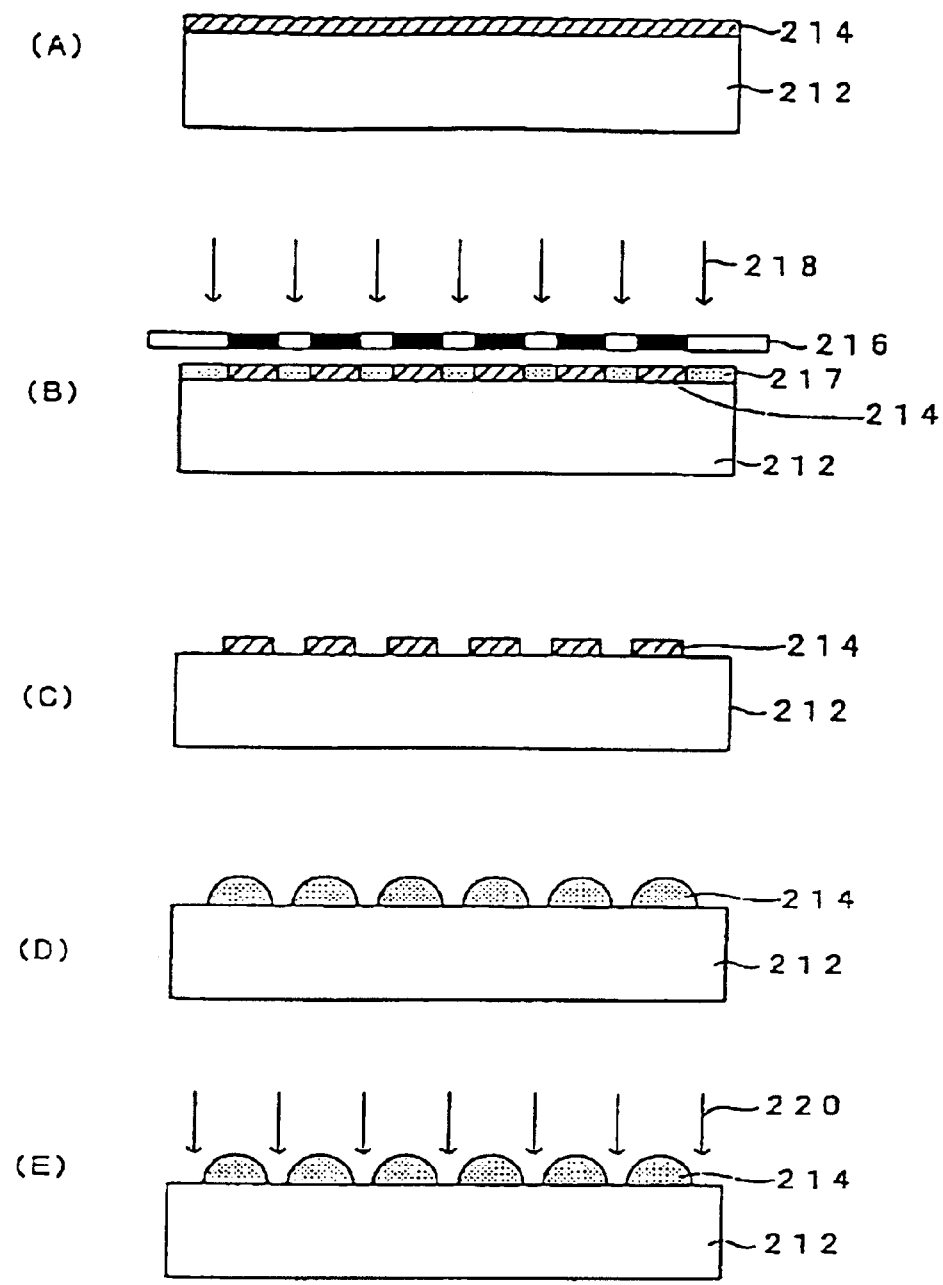
FIGS. 10(A) to 10(E) depict diagrams illustrating the steps of producing a master plate for fabricating the microlens array substrate.
Figure 11:
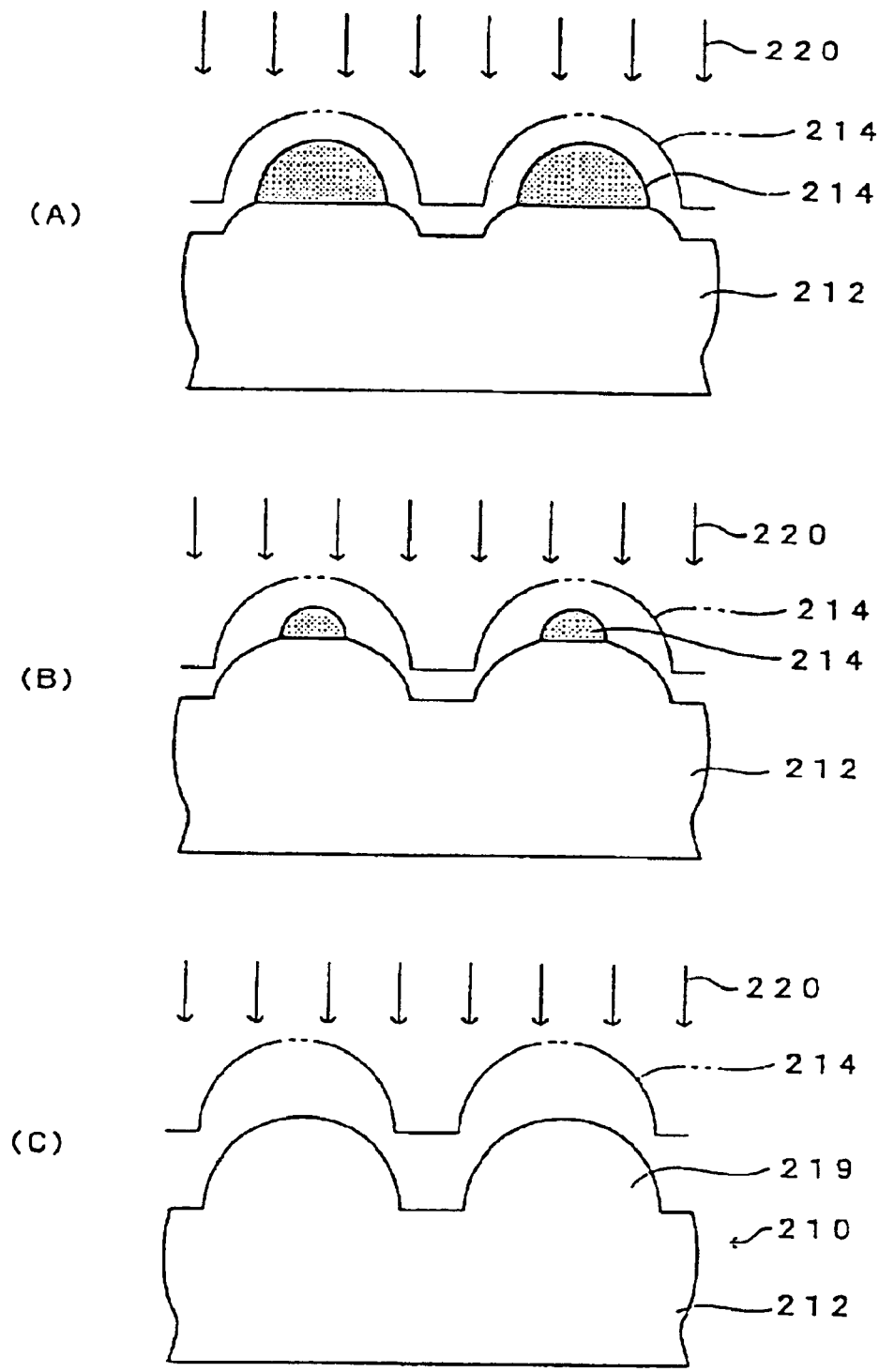
FIGS. 11(A) to 11(C) depict diagrams illustrating the steps of producing a master plate for fabricating the microlens array substrate.

FIG. 5 depicts a diagram illustrating part of a liquid crystal projector as one example of a display device in which the microlens array of the present invention is applied. This liquid crystal projector has a light valve 80 incorporating the microlens array 2 fabricated by the method in the modified example described above and a lamp 70 as a light source.

The microlens array 2 is arranged so that the lenses 52 are convex when seen from the lamp 70. Additionally, a TFT substrate 62 is spaced from the alignment layer 46 by a gap. On the TFT substrate 62, transparent discrete electrodes 64 and thin-film transistors 66 are disposed. An alignment layer 68 is deposited thereon. Furthermore, the TFT substrate 62 is arranged with the alignment layer 68 facing the alignment layer 46.

Liquid crystal 61 is sealed between the alignment layers 46 and 68. The liquid crystal 61 is driven by a voltage that is controlled by the thin-film transistors 66.

According to this liquid crystal projector, light 72 irradiated from the lamp 70 is focussed at lenses 52 at every pixel. Thus, a brighter screen can be displayed.

Moreover, as a precondition, it is necessary that the optical refractive index na' of the light transmitting layer 54 and an optical refractive index nb' of the microlens array substrate 50 have the relationship, $$na' > nb'.$$

When this condition is satisfied, the light is allowed to enter the medium having the greater refractive index from the medium having the smaller refractive index. The light 72 is refracted so as to bend towards the normal of the interface of both media to be focussed. Thus, the screen can be made brighter.

The microlens array in the invention can be applied to optical devices other than display devices, and can be applied to imaging devices, for example. The imaging devices have an image pickup device (image sensor). Light focussed by the microlens array enters the image pickup device. As the image pickup device, a CCD (Charge Coupled Device) type is named.

The invention is not limited to the embodiments described above; various modifications are possible. Additionally, the method for fabricating the microlens array substrate mentioned above is not limited in the invention, but the microlens array substrate can be fabricated as follows, for example.

(First method for fabricating microlens array substrate)

Next, FIGS. 6(A) to 9(C) depict diagrams illustrating one example of the method for fabricating the microlens array substrate.

(Master plate fabricating process)

FIGS. 6(A) to 6(E) depict diagrams illustrating the steps of producing a master plate for fabricating the microlens array substrate. The master plate 20 described in the embodiment mentioned above may be called a second master plate and the master plate described here may be referred as a first master plate.

First, as shown in FIG. 6(A), a resist layer 114 is deposited on a substrate 112. The substrate 112 will have its surface etched to form a master plate 110 (see FIG. 6(E)). The etchable material is not particularly limited, but silicon or quartz is preferable because highly accurate curved surface parts 119 can be easily formed by etching (see FIG. 6(E)).

As the material for forming the resist layer 114, for example, commercially available positive resists of a cresol novolac resin mixed with a diazonaphthoquinone derivative as a sensitizer, which is generally used in fabricating semiconductor devices, can be used. Here, the positive resist is a substance that is exposed to radiation in accordance with a predetermined pattern and thereby the areas exposed to the radiation can be removed selectively by a developer.

As methods for depositing the resist layer 114, methods of spin coating, dipping, spray coating, roll coating, and bar coating can be utilized.

Then, as shown in FIG. 6(B), a mask 116 is arranged above the resist layer 114 and only the predetermined areas of the resist layer 114 are exposed to radiation 118 through the mask 116.

The mask 116 is formed with patterns so as to transmit the radiation 118 only to the areas where it is necessary to form the curved surface parts 119 shown in FIG. 6(E).

Additionally, as the radiation, light having a wavelength ranging from 200 to 500 nm is preferably used. The use of light in this wavelength region can utilize photolithography techniques established in liquid crystal panel fabrication processes and equipment utilized therefore, which can reduce costs.

Subsequently, after the resist layer 114 is exposed to the radiation 118, it is subjected to a development process under predetermined conditions. Then, as shown in FIG. 6(C), only the resist layer 114 in exposed areas 117 to the radiation 118 is selectively removed to reveal the surface of the substrate 112. The areas other than those areas remain covered with the resist layer 114.

The resist layer 114 is thus patterned, and the substrate 112 is etched to a predetermined depth using this resist layer 114 as a mask, as shown in FIG. 6(D).

Specifically, isotropic etching where etching proceeds in all directions is applied to the areas revealed by the resist layer 114 on the substrate 112. For example, wet etching is applied by dipping the substrate 112 into a chemical solution (etchant), thereby conducting isotropic etching. When quartz is used as the substrate 112, etching is conducted by using an aqueous solution (buffered hydrofluoric acid) mixed with hydrofluoric acid and ammonium fluoride, for example. Isotropic etching is conducted and thereby the concave curved surface parts 119 are formed in the substrate 112. Furthermore, the curved surface parts 119 are formed to have a curved surface which is the same as the inverted shape of the lenses 12 of the microlens array substrate 10 (see FIG. 1(A)).

Then, the resist layer 114 is removed after etching has been completed. The substrate 112 has the curved surface parts 119 formed as shown in FIG. 6(E), and is used as the master plate 110.

After producing this master plate 110, it can be used many times, as long as the durability permits. Therefore, it is economical. Additionally, the process of producing the master plate 110 can be omitted in the fabricating process of the second microlens array substrate or later, which allows a reduction in the number of steps and the cost.

In the embodiment described above, the positive resist was used in forming the curved surface parts 119 on the substrate 112. However, a negative resist where areas exposed to radiation are insoluble and areas not exposed to radiation are selectively removable by developers may be used. In this case, a mask having a reverse pattern with respect to that of the above-mentioned mask 116 is used. Alternatively, without using mask, the resist may be directly exposed to laser light or electron beams in a pattern.

(Intermediate plate producing process)

FIGS. 7(A) to 7(C) depict diagrams illustrating the steps of producing the intermediate plate. First, as shown in FIG. 7(A), an intermediate plate precursor 122 is placed on the side of the master plate 110 having the curved surface parts 119. Then, a reinforcing plate 120 is brought into close contact with the master plate 110 with this intermediate plate precursor 122 therebetween. Thus, the intermediate plate precursor 122 is spread over a predetermined region to form a layer made of the intermediate plate precursor 122 between the master plate 110 and the reinforcing plate 120, as shown in FIG. 7(B).

Here, the intermediate plate precursor 122 is placed on the master plate 110, but it may be placed on the reinforcing plate 120 or on both the master plate 110 and the reinforcing plate 120. Alternatively, the intermediate plate precursor 122 may be spread over a predetermined region beforehand on either the master plate 110 or the reinforcing plate 120, or on both, by methods of spin coating, spray coating, roll coating, bar coating or dipping.

The reinforcing plate 120 is for reinforcing an intermediate plate 124, and is not particularly limited as long as it has process resistance in a process for producing the intermediate plate 124 or for producing a replica plate 130 from the intermediate plate 124. For example, substrates made of quartz, glass, resin, metal, or ceramic can be utilized. Furthermore, when the intermediate plate 124 has suitable process resistance by itself, the reinforcing plate 120 is not needed.

As the intermediate plate precursor 122, it is not particularly limited as long as the substance has excellent releasability from the master plate 110 and transferability of the shape of the curved surface parts 119, has process resistance in the subsequent process for producing a replica plate 130 from the intermediate plate 124, and has excellent transferability of the shape of curved surface parts 126 from the intermediate plate 124 to the replica plate 130. As the intermediate plate precursor 122, materials that can be selected as the light transmitting layer precursor 30, described in the above-mentioned embodiment, may be used. These substances are preferable because they have an excellent releasability from silicon or quartz, which is superior as a master plate material in that highly accurate etching can be performed on it.

Moreover, as resins having plasticity, resins having thermoplasticity such as polycarbonate resins, polymethyl methacrylate resins, and amorphous polyolefine resins can be utilized. Such a resin is heated at the softening point temperature or above and thereby it is plasticated and liquefied. After it is sandwiched between the master plate 110 and the reinforcing plate 120, as shown in FIG. 7(B), the plasticated resin is cooled to be cured. Then, the intermediate plate 124 is formed.

The master plate 110 is brought into close contact with the reinforcing plate 120 with the intermediate plate precursor 122 therebetween. Thereby, the intermediate plate precursor 122 is formed into a shape corresponding to the curved surface parts 119 of the master plate 110. Additionally, when the master plate 110 is attached to the reinforcing plate 120, pressure may be applied via at least one of the master plate 110 and the reinforcing plate 120, if necessary.

Applying pressure can reduce the length of time for spreading the intermediate plate precursor 122 over a predetermined region. Thereby, workability is improved and filling of the curved surface parts 119 is ensured.

Then, curing treatment is applied in accordance with the intermediate plate precursor 122. For example, when a light-curable resin is used, light is radiated under predetermined conditions. Thereby, the intermediate plate precursor 122 is cured to form the intermediate plate 124, as shown in FIG. 7(B).

Subsequently, as shown in FIG. 7(C), the intermediate plate 124 is released from the master plate 110; and the reinforcing plate 120 is released, if necessary. The intermediate plate 124 thus obtained has convex curved surface parts 126 corresponding to the concave curved surface parts 119 of the master plate 110 formed therein.

(Replica plate production process)

FIGS. 8(A) to 8(C) depict diagrams illustrating the steps of producing the replica plate from the intermediate plate.

First, as shown in FIG. 8(A), a metal film 132 is deposited on the side of the intermediate plate 124 having the curved surface parts 126 formed thereon and its surface is made to be conductive (a conductor). As the metal film 132, for example, nickel (Ni) may be formed to have a thickness of 500 to 1000 angstroms ($10^{-10}$ m). As a method for depositing the metal film 132, spattering, CVD, evaporation, and electroless plating methods can be used. Additionally, when the surface of the intermediate plate 124 has conductivity required for depositing metal layers by the subsequent electroforming method, it is not necessary to form this conductor.

Then, the metal film 132 is used as a cathode and a tip- or ball-like Ni is used as an anode. Ni is further electrodeposited by electroforming to form a thick metal layer 134, as shown in FIG. 8(B). The following shows one example of an electroplating solution:

Nickel sulfamate: 550 g/l

Boric acid: 35 g/l

Nickel chloride: 5 g/l

Leveling agent: 20 mg/l.

Subsequently, as shown in FIG. 8(C), the metal film 132 and the metal layer 134 are released from the intermediate plate 124, and they are cleaned, if necessary, thus obtaining the replica plate 130. The replica plate 130 is formed with concave curved surface parts 136 corresponding to the convex curved surface parts 126 of the intermediate plate 124. The curved surface parts 136 have a reverse pattern for forming lenses 142 shown in FIG. 9(C) by transfer.

Furthermore, the metal film 132 may be removed from the replica plate 130 by applying a stripping treatment, as necessary.

(Light transmitting layer forming process)

Next, FIGS. 9(A) to 9(C) depict diagrams illustrating the step of forming the light transmitting layer having a plurality of lenses.

First, as shown in FIGS. 9(A) and 9(B), the replica plate 130 is brought into close contact with a reinforcing plate 144 with a light transmitting layer precursor 138 therebetween. This light transmitting layer precursor 138 is the material for the microlens array substrate. This light transmitting layer precursor 138 may be called a first light transmitting layer precursor and the light transmitting layer precursor 30 shown in FIG. 1 may be referred as a second light transmitting layer precursor.

This step is the same as the step illustrated in FIGS. 7(A) to 7(B). The light transmitting layer precursor 138 can also be selected from the substances that are selectable as the intermediate plate precursor 122 shown in FIG. 7(A), but the substance must be transparent. Particularly, acrylic resins are preferable because they cure in a short time with light irradiation by utilizing various precursors or sensitizers (photopolymerization initiator) commercially available and can produce the microlens array substrate 10 having excellent optical characteristics.

Additionally, the reinforcing plate 144 is not particularly limited as long as it satisfies optical physical properties such as transparency or mechanical strength required for the microlens array substrate. For example, quartz or glass, or plastic substrates or films such as polycarbonate, polyallylate, poly(ethersulfone), polyethylene terephthalate, polymethyl methacrylate, and amorphous polyolefine can be utilized. Furthermore, when the microlens array substrate 10 can satisfy physical properties such as mechanical strength required for the substrate by itself, the reinforcing plate 144 is not needed.

The light transmitting layer thus formed on the replica plate 130 will become the microlens array substrate 10.

Moreover, the light transmitting layer constituting this microlens array substrate 10 may be called a first light transmitting layer and the light transmitting layer 32 shown in FIG. 1(B) may be referred as a second light transmitting layer.

Then, as shown in FIG. 9(C), the microlens array substrate 10 and the reinforcing plate 144 are released from the replica plate 130 in one piece. In addition, the reinforcing plate 144 is released from the microlens array substrate 10, as necessary. According to the processes described above, the microlens array substrate 10 can be obtained.

In short, the processes described above are the method by which the intermediate plate 124 is produced from the master plate 110 having the curved surface parts 119, the replica plate 130 is replicated based on the intermediate plate 124, and the entire replica plate 130 produced is used to fabricate the microlens array substrate 10 reinforced by the reinforcing plate 144. According to this, the expensive master plate 110 is used only when the intermediate plate 124 is produced. Thus, the frequency of producing the master plate 110 again due to its deterioration is reduced and the fabrication costs of the microlens array in a general sense can be decreased. Additionally, the replica plate 130 is not directly produced from the master plate 110. Thus, the choice of materials for both plates is widened and the degree of freedom for methods of producing the replica plate 130 is increased. Therefore, transfer of the shapes of the curved surface parts 126 and 136 with high accuracy can be facilitated. Furthermore, enhancement of the durability of the master plate 110 and the replica plate 130 can be facilitated.

(Second method for fabricating microlens array substrate)

FIGS. 10(A) to 11(C) depict diagrams illustrating another example of the method for fabricating the microlens array substrate. The fabrication method described above is a method for fabricating microlens array substrates having convex lenses. However, when the microlens array substrate having concave lenses is to be fabricated, the curved surface parts 119 of the master plate 110 need to have a convex shape. Here, a method for producing a master plate having convex curved surface parts will be described as follows.

First, as shown in FIG. 10(A), a resist layer 214 is deposited on a substrate 212. This step and materials for the substrate 212 and the resist layer 214 are the same as those of the fabrication method described above.

Then, as shown in FIG. 10(B), a mask 216 is arranged above the resist layer 214 and only predetermined areas of the resist layer 214 are exposed to radiation 218 through the mask 216. The mask 216 is formed with patterns so as to transmit the radiation 218 only in the areas where it is necessary to form curved surface parts 219, as shown in FIG. 11(C).

Subsequently, after the resist layer 214 is exposed to the radiation 218, it is subjected to a development process under predetermined conditions. Then, only the resist layer 214 in exposed areas 217 to the radiation 218 is selectively removed to reveal the surface of the substrate 212 and areas other than those remain covered with the resist layer 214.

The resist layer 214 is thus patterned and the resist layer 214 is heated in a reflow process. Then, the resist layer 214 is melted by heat and the surface of the resist layer 214 is formed to have curved surfaces by surface tension, as shown in FIG. 10(D).

Subsequently, as shown in FIG. 10(E), the substrate 212 is etched to a predetermined depth by an etchant 220 using this resist layer as a mask. Specifically, anisotropic etching or dry etching such as reactive ion etching (RIE) is conducted.

FIGS. 11(A) to 11(C) depict diagrams illustrating a process of the substrate being etched. The substrate 212 is partially covered with the resist layer 214 having curved surfaces. The substrate 212 is first etched in the areas not covered with the resist layer 214. Then, the resist layer 214 is etched by the etchant 220 and is gradually made smaller from an area indicated by a chain double-dashed line to an area indicated by a continuous line, as shown in FIGS. 11(A) and 11(B). At this time, the resist layer 214 has curved surfaces. Therefore, the resist layer 214 in this shape is gradually made smaller and then the substrate 212 is revealed little by little; the revealed areas are etched continuously and gradually. In this manner, the substrate 212 is etched continuously and gradually and thus the surface shape of the substrate 212 after etching is formed to have a curved surface. Lastly, as shown in FIG. 11(C), the substrate 212 is formed with convex curved surface parts 219 and a master plate 210 can be obtained.

Once this master plate 210 has been produced, it can also be used repeatedly after that, as long as its durability permits. Therefore, it is economical. Additionally, the production process of the master plate 210 can be omitted in the fabrication process of the second microlens array or later, which can reduce the number of steps and save costs.

The microlens array substrate 2 (see FIG. 3) can be fabricated by using this master plate 210 and by applying the processes described above. In this case, the details described above can also be applied here. The entire disclosure of Japanese Patent Application 2000-226675, filed Jul. 27, 2000 is herein incorporated by reference.

What is claimed is:

1. A method for fabricating a microlens array comprising:
    a first step of bringing a lens side of a microlens array substrate having a plurality of lenses formed thereon into close contact with a flat surface of a master plate, in which one surface is said flat surface, with a light transmitting layer precursor therebetween;
    a second step of pressing said light transmitting layer precursor with said flat surface of said master plate to disperse said light transmitting layer precursor over said plurality of lenses formed on said mircolens substrate;
    a third step of curing said light transmitting layer precursor to form a light transmitting layer; and
    a fourth step of releasing said master plate from said light transmitting layer so that said light transmitting layer includes a substantially flat surface.

2. The method for fabricating the microlens array according to claim 1 further comprising a step of forming at least one of a black matrix, an electrode, and an alignment layer on said light transmitting layer.

3. The method for fabricating the microlens array according to claim 1 further comprising a step of depositing a protective coating on said light transmitting layer.

4. The method for fabricating the microlens array according to claim 3 further comprising a step of forming at least one of a black matrix, an electrode, and an alignment layer on said protective coating.

5. The method for fabricating the microlens array according to claim 1, wherein said light transmitting layer precursor includes a substance which can be cured by applying energy.

6. The method for fabricating the microlens array according to claim 5, wherein said energy is at least one of light and heat.

7. The method for fabricating the microlens array according to claim 1, wherein said light transmitting layer precursor is made of a resin.

8. A microlens array fabricated by the method according to claim 1.

9. An optical device having the microlens array according to claim 8.

10. The optical device according to claim 9, wherein the optical device is a display device having a light source for radiating light toward said microlens array.

11. The optical device according to claim 9, wherein the optical device is an imaging device having an image pick-up device that light focussed by said microlens array enters.

12. A method for fabricating a microlens array comprising:

forming a plurality of microlenses on a substrate;

disposing a light transmitting layer precursor onto said substrate;

disposing a flat reinforcing plate onto said light transmitting layer precursor to disperse said light transmitting layer precursor over said microlenses of said substrate;

curing said light transmitting layer precursor in order to form a light transmitting layer; and removing said reinforcing plate from said light transmitting layer so that said light transmitting layer contains a flat surface.

* * * * *